UNITED STATES PATENT OFFICE.

CARL ALEXIS MAYER AND CHARLES DE LA HARPE, OF BASLE, SWITZERLAND, ASSIGNORS TO L. DURAND, HUGUENIN & CO., OF SAME PLACE, ST. FONS, FRANCE, AND HÜNINGEN, GERMANY.

LEUCO COMPOUND AND PROCESS OF MAKING IT.

SPECIFICATION forming part of Letters Patent No. 547,173, dated October 1, 1895.

Application filed July 8, 1895. Serial No. 555,331. (Specimens.) Patented in France July 4, 1893, No. 231,316, and July 30, 1894; in England July 4, 1893, No. 24,802, and August 7, 1894, No. 15,064, and in Germany October 6, 1893, No. 77,452, and July 29, 1894, No. 79,839.

*To all whom it may concern:*

Be it known that we, CARL ALEXIS MAYER and CHARLES DE LA HARPE, citizens of the Swiss Republic, residing at Basle, Switzerland, have invented certain Improvements in the Manufacture of Leuco Compounds Suitable for Printing of Textures, (which have been patented in France by Letters Patent No. 231,316, dated July 4, 1893, and patent of addition, dated July 30, 1894; in England by Letters Patent No. 24,802, dated July 4, 1893, and No. 15,064, dated August 7, 1894, and in Germany by Letters Patent No. 77,452, dated October 6, 1893, and No. 79,839, dated July 29, 1894,) of which the following is a specification.

We have discovered that the phenols may be caused to combine with gallocyanin dyes when in solution and under the influence of heat, the product of the reaction being certain slightly-colored leuco compounds, which when oxidized after printing on texture assume a blue to blue-violet color.

In producing the compounds which form the subject of the present invention, we preferably employ resorcin, while by the term "gallocyanin dyes" we refer to the condensation products of the hydrochlorate of nitrosodialkylanilin or of the hydrochlorate of dialkylamidoazobenzene with gallic acid or a derivative thereof—as, for example, gallamic acid, the methylether of gallic acid, gallanilid, (product obtained by condensation of tannic acid with anilin,) &c. The production of these new leuco bodies will be clearly understood from the two following examples.

*Example I. Production of the leuco compound by the combination of resorcin with the gallocyanin dye resulting from the condensation of gallic acid with the hydrochlorate of nitrosodimethylanilin.*—Three hundred parts of the dye obtained with gallic acid and hydrochlorate of nitrosodimethylanilin or hydrochlorate of dimethylamidoazobenzene are heated with one hundred and fifty parts of resorcin, two hundred parts of water, and nine hundred parts of commercial muriatic acid at the temperature of the water bath until all blue-violet coloration has disappeared and crystals in the form of greenish-yellow needles have been precipitated. We then dilute with water and wash repeatedly for removing the impurities. The green body thus obtained is nearly insoluble in cold water, sparingly soluble in hot water, insoluble in a solution of acetate of soda, very sparingly soluble in alcohol and in glacial acetic acid. In a ten-per-cent. soda solution and in caustic soda it dissolves with a yellow-green coloration, turning to violet. Its solution in concentrated sulfuric acid is green-brown and becomes by the addition of the smallest trace of nitric acid first blue and then red.

If in this foregoing example the gallocyanin dye obtained by the condensation of hydrochlorate of nitrosodimethylanilin or of hydrochlorate of dimethylamidoazobenzene and gallic acid is replaced by the gallocyanin dyes resulting from the condensation of hydrochlorate of nitrosodimethylanilin or of hydrochlorate of dimethylamidoazobenzene with methyl-ether of gallic acid or gallamic acid or gallanilid, quite analogous leuco compounds are obtained.

*Example II. Production of the coloring-matter by the condensation of resorcin with the gallocyanin dye resulting from the condensation of gallamic acid with the hydrochlorate of diethylamidoazobenzene or the hydrochlorate of nitrosodiethylanilin.*—We heat three hundred parts of the dye resulting from the action of the gallamic acid on the hydrochlorate of diethylamidoazobenzene or upon the hydrochlorate of nitrosodiethylanilin with one hundred and fifty parts of resorcin, two hundred parts of water, and nine hundred parts of commercial muriatic acid at the temperature of the water bath until all blue coloration has disappeared. The green body thus obtained, which is nearly insoluble in acidulated water, in alcohol, and in a solution of acetate of soda, is soluble in pure cold and hot water. In a ten-per-cent. soda solution and in caustic soda it dissolves with a yellow-green coloration, turning quickly to blue. It is moderately soluble in hot glacial acetic acid.

Its solution in concentrated sulfuric acid is yellow-brown, and becomes by the addition of the slightest quantity of nitric acid first blue and then red. When printed on the calico and oxidized on the fiber the new leuco body is transformed in a blue coloring-matter.

Having thus described our invention, we claim—

1. The herein described process for the production of a leuco-body, suitable for printing of textures by the condensation of a phenol, with a gallocyanin dye.

2. The herein described process for the production of a leuco-body, suitable for printing of textures, by the condensation of resorcin with a gallocyanin dye obtained by the action of hydrochlorate of nitrosodialkylanilin or of hydrochlorate of dialkylamidoazobenzene on gallic acid or its derivatives.

3. As a new article of manufacture, the herein described leuco-body suitable for printing of textures and produced by the condensation of resorcin with a gallocyanin dye, said leuco-body coloring textures when printed thereon and oxidized on the fiber, to a blue tint, being insoluble in a solution of acetate of soda, soluble in caustic soda with a greenish coloration, sparingly soluble in alcohol, and soluble in concentrated sulfuric acid with a brown coloration, which by the addition of the slightest quantity of nitric acid becomes first blue and then red.

In witness whereof we have hereunto signed our names in the presence of two subscribing witnesses.

CARL ALEXIS MAYER.
CHARLES DE LA HARPE.

Witnesses:
GEORGE GIFFORD,
AMAND RITTER.